(12) United States Patent
Gollier et al.

(10) Patent No.: US 11,953,688 B1
(45) Date of Patent: *Apr. 9, 2024

(54) HIGH-RESOLUTION LIQUID CRYSTAL DISPLAYS

(71) Applicant: META PLATFORMS TECHNOLOGIES, LLC, Menlo Park, CA (US)

(72) Inventors: Jacques Gollier, Sammamish, WA (US); Ying Geng, Bellevue, WA (US); Dong Chen, Foster City, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 68 days.

This patent is subject to a terminal disclaimer.

(21) Appl. No.: 17/943,034

(22) Filed: Sep. 12, 2022

Related U.S. Application Data

(63) Continuation of application No. 16/816,915, filed on Mar. 12, 2020, now Pat. No. 11,442,272.

(51) Int. Cl.
| | |
|---|---|
| *G02B 27/01* | (2006.01) |
| *B60K 35/00* | (2006.01) |
| *G02B 27/14* | (2006.01) |
| *G02B 27/28* | (2006.01) |

(52) U.S. Cl.
CPC ....... *G02B 27/0172* (2013.01); *G02B 27/141* (2013.01); *G02B 27/149* (2013.01); *G02B 27/283* (2013.01); *G02B 2027/0114* (2013.01); *G02B 2027/0147* (2013.01)

(58) Field of Classification Search
CPC ............ G02B 27/0172; G02B 27/0101; G02B 27/141; G02B 27/149; G02B 2027/0114; B60K 35/00; B60K 2370/1529
See application file for complete search history.

(56) References Cited

U.S. PATENT DOCUMENTS

| | | |
|---|---|---|
| 11,442,272 B2 * | 9/2022 | Gollier ................ G02B 27/141 |
| 2008/0122772 A1 | 5/2008 | Takeuchi et al. |
| 2018/0120579 A1 | 5/2018 | Gollier et al. |
| 2018/0267309 A1 | 9/2018 | Klug et al. |
| 2020/0026083 A1 | 1/2020 | Yamamoto |
| 2020/0089012 A1 | 3/2020 | Koshihara |
| 2020/0285064 A1 | 9/2020 | Takeda et al. |
| 2020/0301145 A1 | 9/2020 | Li |
| 2021/0176440 A1 * | 6/2021 | St. Hilaire ......... G03B 21/2073 |

FOREIGN PATENT DOCUMENTS

| | | |
|---|---|---|
| GB | 2222892 A | 3/1990 |

* cited by examiner

*Primary Examiner* — Ryan D Howard
(74) *Attorney, Agent, or Firm* — Foley & Lardner LLP

(57) ABSTRACT

Various embodiments set forth high-resolution liquid crystal displays and components thereof. In some embodiments, light emitted by a high-resolution green color liquid crystal display is combined, via a combiner, with light emitted by at least one lower-resolution red and blue color liquid crystal display. The red and blue color display(s) may include a single display or two displays positioned on opposing sides of the combiner. The combiner may be a dichroic or polarization-based combiner. Combined light from the green color display and the red and blue color display(s) is passed through collimating optics, such as a pancake lens or a Fresnel lens, toward a viewer's eye.

17 Claims, 14 Drawing Sheets

HIGH-RESOLUTION LIQUID CRYSTAL DISPLAYS

CROSS-REFERENCE TO RELATED APPLICATIONS

This application is a continuation of the co-pending U.S. patent application titled, "HIGH-RESOLUTION LIQUID CRYSTAL DISPLAYS," filed on Mar. 12, 2020 and having Ser. No. 16/816,915. The subject matter of these related applications is hereby incorporated herein by reference.

BACKGROUND

Field of the Various Embodiments

Embodiments of this disclosure relate generally to display systems and, more specifically, to high-resolution liquid crystal displays.

Description of the Related Art

Artificial reality systems display content that may include completely generated content or generated content combined with captured (e.g., real-world) content. One limitation to generating high resolution and large field of view (FOV) content is the lack of displays having small pixel pitch and high pixel count. Further, some artificial reality systems, such as head-mounted displays (HMDs), include pancake lenses, which are reflective optical systems that are relatively compact but provide limited optical transmission. Very bright displays are typically required to counterbalance the limited optical transmission of pancake lenses.

Conventional color liquid crystal displays (LCDs) typically include a backlight, such as one or more light emitting diodes (LEDs), and an array of LCD pixels. Each of the pixels includes red, green, and blue sub-pixels, which have corresponding color filters for rendering red, green, and blue colors.

LCD backlights can be engineered to meet the brightness requirements of artificial reality systems, including HMDs. However, the pixel pitch of conventional color LCDs is limited (to approximately 20 to 25 microns). As a result, conventional color LCDs have limited utility in some artificial reality systems, such as HMDs, that require smaller pixel pitches and higher pixel counts.

SUMMARY

One embodiment of the present disclosure sets forth a display system. The display system includes a first display configured to emit light within a first range of wavelengths, and a second display configured to emit light within at least one other range of wavelengths. The display system further includes a combiner element. In addition, the display system includes a collimating optical element.

Another embodiment of the present disclosure sets forth a head-mounted display (HMD). The HMD includes a display system that includes a first display configured to emit light within a first range of wavelengths, and a second display configured to emit light within at least one other range of wavelengths. The display system further includes a combiner element. In addition, the display system includes a collimating optical element.

Another embodiment of the present disclosure sets forth a method. The method includes emitting, via a first display, light within a first range of wavelengths, and emitting, via a second display, light within at least one other range of wavelengths. The method further includes combining, via a combiner element, the light within the first range of wavelengths and the light within the at least one other range of wavelengths to generate combined light. In addition, the method includes passing the combined light through a collimating optical element.

One advantage of the display systems disclosed herein is that higher display resolutions can be achieved relative to conventional color LCDs. In addition, the display systems disclosed herein can be brighter than conventional color LCDs, particularly for green colored light. As a result, the display systems disclosed herein may be more suitable for some artificial reality systems, such as HMDs, than conventional color LCDs. These technical advantages represent one or more technological advancements over prior art approaches.

BRIEF DESCRIPTION OF THE DRAWINGS

So that the manner in which the above recited features of the various embodiments can be understood in detail, a more particular description of the disclosed concepts, briefly summarized above, may be had by reference to various embodiments, some of which are illustrated in the appended drawings. It is to be noted, however, that the appended drawings illustrate only typical embodiments of the disclosed concepts and are therefore not to be considered limiting of scope in any way, and that there are other equally effective embodiments.

DETAILED DESCRIPTION

Figure 1A:
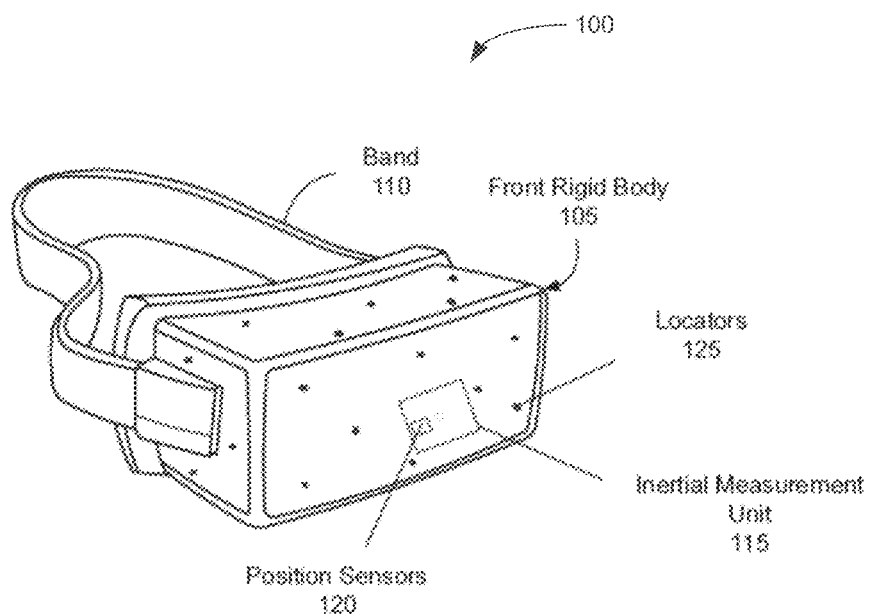
FIG. 1A is a diagram of a near eye display (NED), according to various embodiments.

In the following description, numerous specific details are set forth to provide a more thorough understanding of the various embodiments. However, it is apparent to one of skilled in the art that the disclosed concepts may be practiced without one or more of these specific details.

Configuration Overview

One or more embodiments disclosed herein relate to high-resolution liquid crystal displays (LCDs). In some embodiments, light emitted by a high-resolution green color liquid crystal display is combined, via a combiner, with light emitted by at least one lower-resolution red and blue color liquid crystal display. The red and blue color display(s) may include a single display or two displays positioned on opposing sides of the combiner. The combiner may be a dichroic or polarization-based combiner. Combined light from the green color display and the red and blue color display(s) is passed through collimating optics, such as a pancake lens or a Fresnel lens, toward a viewer's eye.

As human eyes are most sensitive to green colored light, use of a higher-resolution green color display permits increased resolution relative to conventional color LCDs. In that regard, some embodiments employ a 1:2 or 1:1 sub-pixel aperture ratio, which permits the sub-pixels and pixels of the display system to be smaller than the sub-pixels and pixels in conventional color LCDs. As a result, higher display resolutions can be achieved relative to conventional color LCDs. In addition, a green color display that includes green light emitting diodes (LEDs), or a quantum dot (QD) layer embedded in a back light unit (BLU), can be used to achieve higher transmissivity of green colored light relative to conventional color LCDs that rely on color filters.

Embodiments of the disclosure may also include or be implemented in conjunction with an artificial reality system. Artificial reality is a form of reality that has been adjusted in some manner before presentation to a user, which may include, for example, a virtual reality (VR) system, an augmented reality (AR) system, a mixed reality (MR) system, a hybrid reality system, or some combination and/or derivatives thereof. Artificial reality content may include, without limitation, completely generated content or generated content combined with captured (e.g., real-world) content. The artificial reality content may include, without limitation, video, audio, haptic feedback, or some combination thereof. The artificial reality content may be presented in a single channel or in multiple channels (such as stereo video that produces a three-dimensional effect to the viewer). Additionally, in some embodiments, artificial reality systems may also be associated with applications, products, accessories, services, or some combination thereof, that are used to, e.g., create content in an artificial reality system and/or are otherwise used in (e.g., perform activities in) an artificial reality system. The artificial reality system may be implemented on various platforms, including a head-mounted display (HMD) connected to a host computer system, a standalone HMD, a mobile device or computing system, or any other hardware platform capable of providing artificial reality content to one or more viewers.

System Overview

FIG. 1A is a wire diagram of a near eye display (NED) 100, according to various embodiments. Although NEDs and head mounted displays (HMDs) are disclosed herein as reference examples, display devices that include high-resolution liquid crystal display systems may also be configured for placement in proximity of an eye or eyes of a user at a fixed location, without being head-mounted (e.g., the display device may be mounted in a vehicle, such as a car or an airplane, for placement in front of an eye or eyes of the user).

As shown, the NED 100 includes a front rigid body 105 and a band 110. The front rigid body 105 includes one or more electronic display elements of an electronic display (not shown), an inertial measurement unit (IMU) 115, one or more position sensors 120, and locators 125. As illustrated in FIG. 1A, position sensors 120 are located within the IMU 115, and neither the IMU 115 nor the position sensors 120 are visible to the user. In various embodiments, where the NED 100 acts as an AR or MR device, portions of the NED 100 and/or its internal components are at least partially transparent.

Figure 1B:
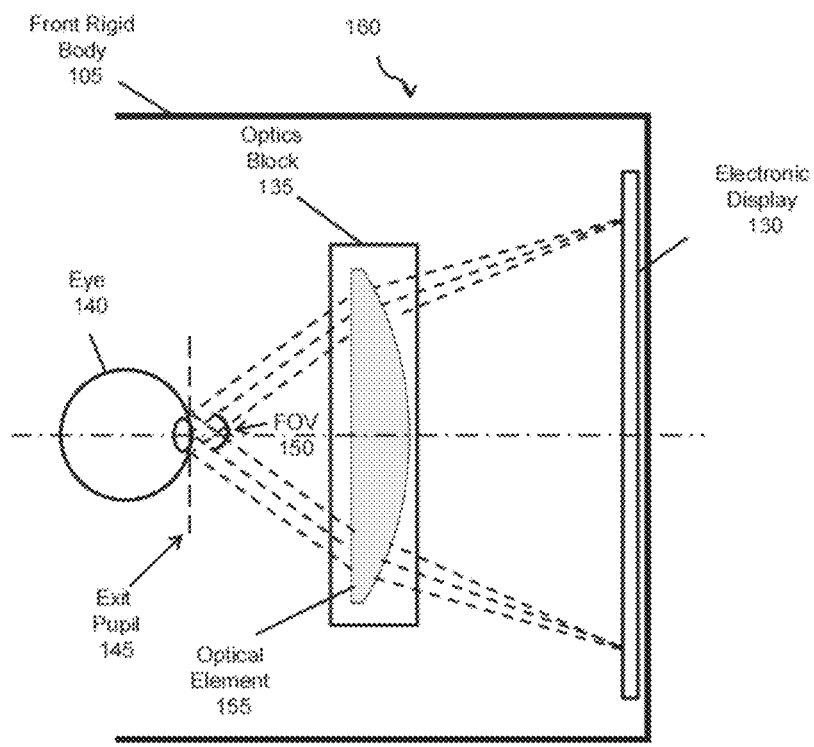
FIG. 1B is a cross section of the front rigid body of the embodiments of the NED illustrated in FIG. 1A.

FIG. 1B is a cross section 160 of the front rigid body 105 of the embodiments of the NED 100 illustrated in FIG. 1A. As shown, the front rigid body 105 includes an electronic display 130 and an optics block 135 that together provide image light to an exit pupil 145. The exit pupil 145 is the location of the front rigid body 105 where a user's eye 140 may be positioned. For purposes of illustration, FIG. 1B shows a cross section 160 associated with a single eye 140, but another optics block, separate from the optics block 135, may provide altered image light to another eye of the user. Additionally, the NED 100 includes an eye tracking system (not shown in FIG. 1B). The eye tracking system may include one or more sources that illuminate one or both eyes of the user. The eye tracking system may also include one or more cameras that capture images of one or both eyes of the user to track the positions of the eyes.

The electronic display 130 displays images to the user. In various embodiments, the electronic display 130 may comprise a single electronic display or multiple electronic displays (e.g., a display for each eye of a user). Examples of the electronic display 130 include: a liquid crystal display (LCD), an organic light emitting diode (OLED) display, an active-matrix organic light-emitting diode display (AMO-LED), a QOLED, a QLED, some other display, or some combination thereof.

The optics block 135 adjusts an orientation of image light emitted from the electronic display 130 such that the electronic display 130 appears at particular virtual image distances from the user. The optics block 135 is configured to receive image light emitted from the electronic display 130 and direct the image light to an eye-box associated with the exit pupil 145. The image light directed to the eye-box forms an image at a retina of eye 140. The eye-box is a region defining how much the eye 140 moves up/down/left/right from without significant degradation in the image quality. In the illustration of FIG. 1B, a field of view (FOV) 150 is the extent of the observable world that is seen by the eye 140 at any given moment.

Additionally, in some embodiments, the optics block 135 magnifies received light, corrects optical errors associated with the image light, and presents the corrected image light to the eye 140. The optics block 135 may include one or more optical elements 155 in optical series. An optical element 155 may be an aperture, a Fresnel lens, a convex lens, a concave lens, a filter, a waveguide, a Pancharatnam-Berry phase (PBP) lens or grating, a color-selective filter, a waveplate, a C-plate, or any other suitable optical element 155 that affects the image light. Moreover, the optics block 135 may include combinations of different optical elements. One or more of the optical elements in the optics block 135 may have one or more coatings, such as anti-reflective coatings.

In some embodiments, the electronic display 130 and the optics block 135 may include components of a high-resolution liquid crystal display system, examples of which are discussed in greater detail below in conjunction with FIGS. 4 and 6-13.

Figure 2A:
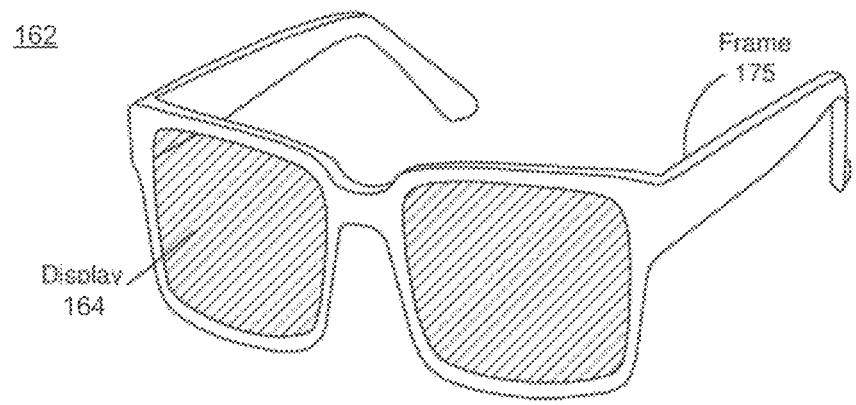
FIG. 2A is a diagram of a head-mounted display (HMD) implemented as a NED, according to various embodiments.

FIG. 2A is a diagram of an HMD 162 implemented as a NED, according to various embodiments. As shown, the HMD 162 is in the form of a pair of augmented reality glasses. The HMD 162 presents computer-generated media to a user and augments views of a physical, real-world environment with the computer-generated media. Examples of computer-generated media presented by the HMD 162 include one or more images, video, audio, or some combination thereof. In some embodiments, audio is presented via an external device (e.g., speakers and headphones) that receives audio information from the HMD 162, a console (not shown), or both, and presents audio data based on audio information. In some embodiments, the HMD 162 may be modified to also operate as a VR HMD, a MR HMD, or some combination thereof. The HMD 162 includes a frame 175 and a display 164. As shown, the frame 175 mounts the NED to the user's head, while the display 164 provides image light to the user. The display 164 may be customized to a variety of shapes and sizes to conform to different styles of eyeglass frames.

Figure 2B:
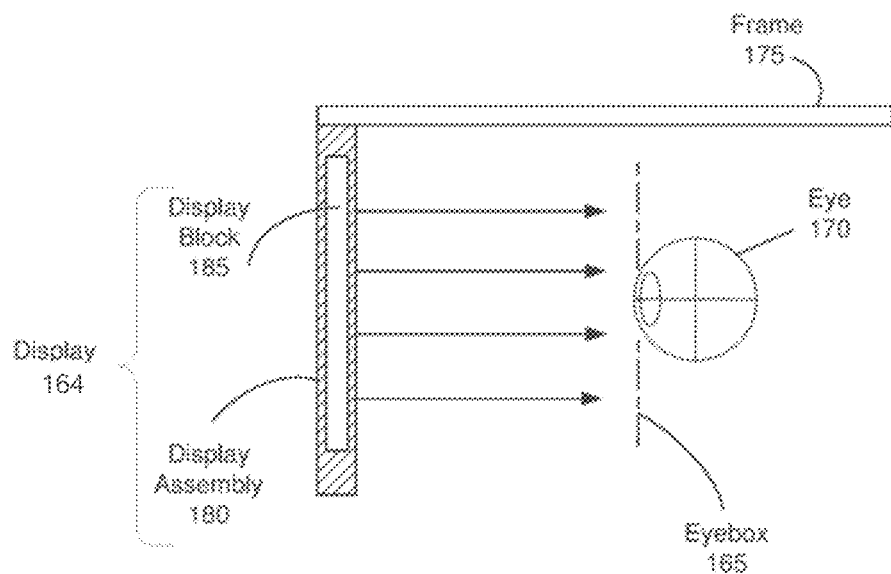
FIG. 2B is a cross-section view of the HMD of FIG. 2A implemented as a near eye display, according to various embodiments.

FIG. 2B is a cross-section view of the HMD 162 of FIG. 2A implemented as a NED, according to various embodiments. This view includes frame 175, display 164 (which comprises a display assembly 180 and a display block 185), and eye 170. The display assembly 180 supplies image light to the eye 170. The display assembly 180 houses display block 185, which, in different embodiments, encloses the different types of imaging optics and redirection structures. For purposes of illustration, FIG. 2B shows the cross section associated with a single display block 185 and a single eye 170, but in alternative embodiments not shown, another display block, which is separate from display block 185 shown in FIG. 2B, provides image light to another eye of the user.

The display block 185, as illustrated, is configured to combine light from a local area with light from computer generated image to form an augmented scene. The display block 185 is also configured to provide the augmented scene to the eyebox 165 corresponding to a location of the user's eye 170. The display block 185 may include, for example, a waveguide display, a focusing assembly, a compensation assembly, or some combination thereof. In some embodiments, the display block 185 may include one or more components of the high-resolution liquid crystal display systems discussed in detail below in conjunction with FIGS. 4 and 6-13.

HMD 162 may include one or more other optical elements between the display block 185 and the eye 170. The optical elements may act to, for example, correct aberrations in image light emitted from the display block 185, magnify image light emitted from the display block 185, some other optical adjustment of image light emitted from the display block 185, or some combination thereof. The example for optical elements may include an aperture, a Fresnel lens, a convex lens, a concave lens, a filter, or any other suitable optical element that affects image light. The display block 185 may also comprise one or more materials (e.g., plastic, glass, etc.) with one or more refractive indices that effectively minimize the weight and widen a field of view of the HMD 162.

Figure 3:
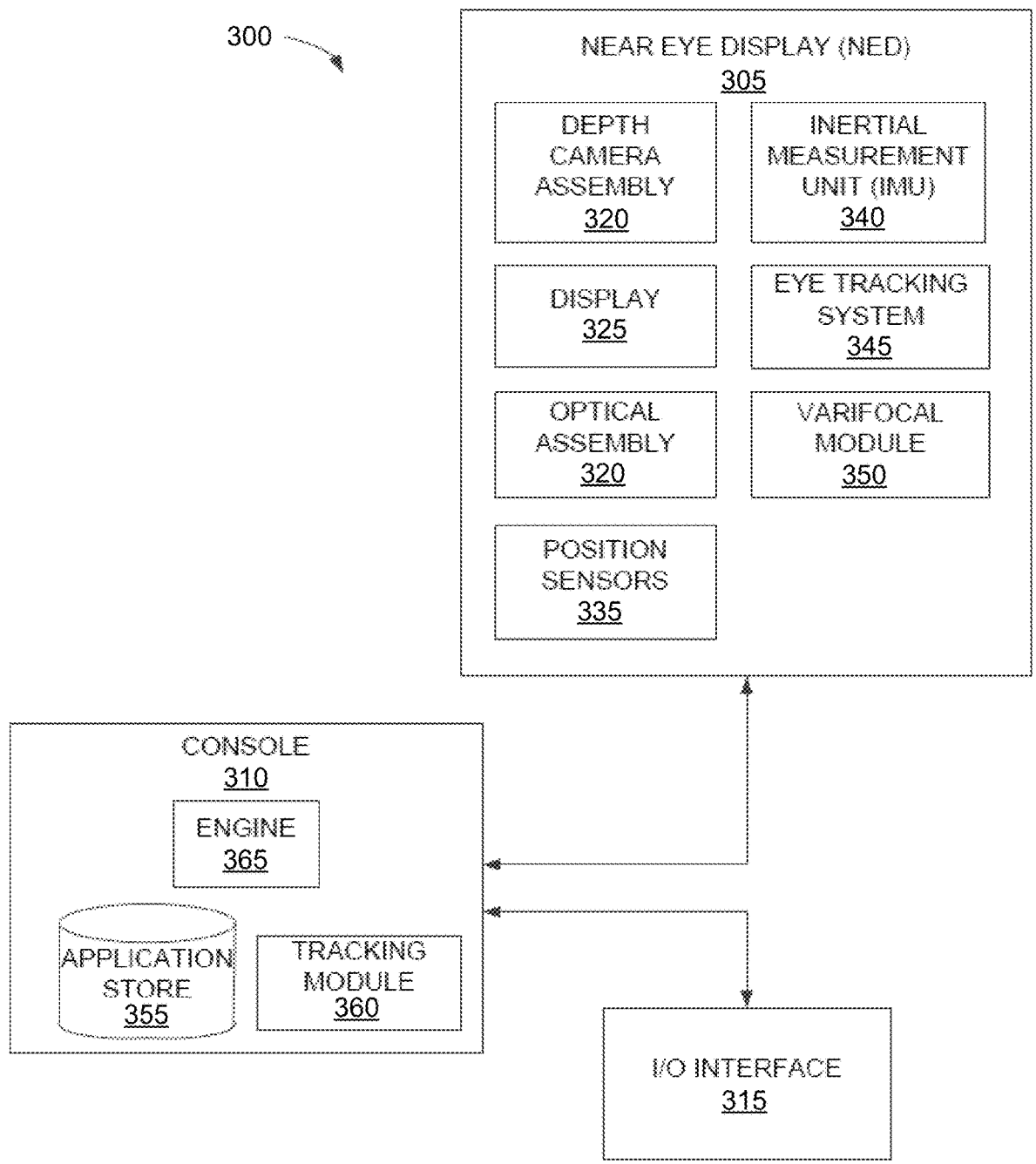
FIG. 3 is a block diagram of a NED system, according to various embodiments.

FIG. 3 is a block diagram of an embodiment of a near eye display system 300 in which a console 310 operates. In some embodiments, the NED system 300 corresponds to the NED 100 or the HMD 162. The NED system 300 may operate in a VR system environment, an AR system environment, a MR system environment, or some combination thereof. The NED system 300 shown in FIG. 3 comprises a NED 305 and an input/output (I/O) interface 315 that is coupled to the console 310.

While FIG. 3 shows an example NED system 300 including one NED 305 and one I/O interface 315, in other embodiments any number of these components may be included in the NED system 300. For example, there may be multiple NEDs 305 that each has an associated I/O interface 315, where each NED 305 and I/O interface 315 communicates with the console 310. In alternative configurations, different and/or additional components may be included in the NED system 300. Additionally, various components included within the NED 305, the console 310, and the I/O interface 315 may be distributed in a different manner than is described in conjunction with FIG. 3 in some embodiments. For example, some or all of the functionality of the console 310 may be provided by the NED 305.

The NED 305 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 305 may also present audio content to a user. The NED 305 and/or the console 310 may transmit the audio content to an external device via the I/O interface 315. The external device may include various forms of speaker systems and/or headphones. In various embodiments, the audio content is synchronized with visual content being displayed by the NED 305.

The NED 305 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 3, the NED 305 may include a depth camera assembly (DCA) 320, a display 325, an optical assembly 330, one or more position sensors 335, an inertial measurement unit (IMU) 340, an eye tracking system 345, and a varifocal module 350. In some embodiments, the display 325 and the optical assembly 330 can be integrated together into a projection assembly. Various embodiments of the NED 305 may have additional, fewer, or different components than those listed above. Additionally, the functionality of each component may be partially or completely encompassed by the functionality of one or more other components in various embodiments.

The DCA 320 captures sensor data describing depth information of an area surrounding the NED 305. The sensor data may be generated by one or a combination of depth imaging techniques, such as triangulation, structured light imaging, time-of-flight imaging, laser scan, and so forth.

The DCA 320 can compute various depth properties of the area surrounding the NED 305 using the sensor data. Additionally or alternatively, the DCA 320 may transmit the sensor data to the console 310 for processing.

The DCA 320 includes an illumination source, an imaging device, and a controller. The illumination source emits light onto an area surrounding the NED 305. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light in the environment surrounding NED 305, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The display 325 displays two-dimensional or three-dimensional images to the user in accordance with pixel data received from the console 310. In various embodiments, the display 325 comprises a single display or multiple displays (e.g., separate displays for each eye of a user). In some embodiments, the display 325 comprises a single or multiple waveguide displays. Light can be coupled into the single or multiple waveguide displays via, e.g., a LCD, an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the displays types may be incorporated in display 325 and used separately, in parallel, and/or in combination.

The optical assembly 330 magnifies image light received from the display 325, corrects optical errors associated with the image light, and presents the corrected image light to a user of the NED 305. The optical assembly 330 includes a plurality of optical elements. For example, one or more of the following optical elements may be included in the optical assembly 330: an aperture, a Fresnel lens, a convex lens, a concave lens, a filter, a reflecting surface, or any other suitable optical element that deflects, reflects, refracts, and/or in some way alters image light. Moreover, the optical assembly 330 may include combinations of different optical elements. In some embodiments, one or more of the optical elements in the optical assembly 330 may have one or more coatings, such as partially reflective or antireflective coatings. The optical assembly 330 can be integrated into a projection assembly, e.g., a projection assembly. In one embodiment, the optical assembly 330 includes the optics block 155.

In operation, the optical assembly 330 magnifies and focuses image light generated by the display 325. In so doing, the optical assembly 330 enables the display 325 to be physically smaller, weigh less, and consume less power than displays that do not use the optical assembly 330. Additionally, magnification may increase the field of view of the content presented by the display 325. For example, in some embodiments, the field of view of the displayed content partially or completely uses a user's field of view. For example, the field of view of a displayed image may meet or exceed 310 degrees. In various embodiments, the amount of magnification may be adjusted by adding or removing optical elements.

In some embodiments, the optical assembly 330 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 325 is pre-distorted, and the optical assembly 330 corrects the distortion as image light from the display 325 transmits various optical elements of the optical assembly 330. In some embodiments, optical elements of the optical assembly 330 are integrated into the display 325 as a projection assembly that includes at least one waveguide coupled with one or more optical elements. In some embodiments the display 325 and/or the optical assembly 330 may include the peripheral display systems or components thereof discussed below in conjunction with FIGS. 4-7.

In some embodiments, the display 325 and the optical assembly 330 may include one or more components of the high-resolution liquid crystal display systems discussed in detail below in conjunction with FIGS. 4 and 6-13.

The IMU 340 is an electronic device that generates data indicating a position of the NED 305 based on measurement signals received from one or more of the position sensors 335 and from depth information received from the DCA 320. In some embodiments of the NED 305, the IMU 340 may be a dedicated hardware component. In other embodiments, the IMU 340 may be a software component implemented in one or more processors.

In operation, a position sensor 335 generates one or more measurement signals in response to a motion of the NED 305. Examples of position sensors 335 include: one or more accelerometers, one or more gyroscopes, one or more magnetometers, one or more altimeters, one or more inclinometers, and/or various types of sensors for motion detection, drift detection, and/or error detection. The position sensors 335 may be located external to the IMU 340, internal to the IMU 340, or some combination thereof.

Based on the one or more measurement signals from one or more position sensors 335, the IMU 340 generates data indicating an estimated current position of the NED 305 relative to an initial position of the NED 305. For example, the position sensors 335 may include multiple accelerometers to measure translational motion (forward/back, up/down, left/right) and multiple gyroscopes to measure rotational motion (e.g., pitch, yaw, and roll). In some embodiments, the IMU 340 rapidly samples the measurement signals and calculates the estimated current position of the NED 305 from the sampled data. For example, the IMU 340 may integrate the measurement signals received from the accelerometers over time to estimate a velocity vector and integrates the velocity vector over time to determine an estimated current position of a reference point on the NED 305. Alternatively, the IMU 340 provides the sampled measurement signals to the console 310, which analyzes the sample data to determine one or more measurement errors. The console 310 may further transmit one or more of control signals and/or measurement errors to the IMU 340 to configure the IMU 340 to correct and/or reduce one or more measurement errors (e.g., drift errors). The reference point is a point that may be used to describe the position of the NED 305. The reference point may generally be defined as a point in space or a position related to a position and/or orientation of the NED 305.

In various embodiments, the IMU 340 receives one or more parameters from the console 310. The one or more parameters are used to maintain tracking of the NED 305. Based on a received parameter, the IMU 340 may adjust one or more IMU parameters (e.g., a sample rate). In some embodiments, certain parameters cause the IMU 340 to update an initial position of the reference point so that it corresponds to a next position of the reference point. Updating the initial position of the reference point as the next calibrated position of the reference point helps reduce drift errors in detecting a current position estimate of the IMU 340.

In some embodiments, the eye tracking system 345 is integrated into the NED 305. The eye-tracking system 345 may comprise one or more illumination sources and an imaging device (camera). In operation, the eye tracking system 345 generates and analyzes tracking data related to a user's eyes as the user wears the NED 305. The eye tracking system 345 may further generate eye tracking information that may comprise information about a position of the user's eye, i.e., information about an angle of an eye-gaze.

In some embodiments, the varifocal module 350 is further integrated into the NED 305. The varifocal module 350 may be communicatively coupled to the eye tracking system 345 in order to enable the varifocal module 350 to receive eye tracking information from the eye tracking system 345. The varifocal module 350 may further modify the focus of image light emitted from the display 325 based on the eye tracking information received from the eye tracking system 345. Accordingly, the varifocal module 350 can reduce vergence-accommodation conflict that may be produced as the user's eyes resolve the image light. In various embodiments, the varifocal module 350 can be interfaced (e.g., either mechanically or electrically) with at least one optical element of the optical assembly 330.

In operation, the varifocal module 350 may adjust the position and/or orientation of one or more optical elements in the optical assembly 330 in order to adjust the focus of image light propagating through the optical assembly 330. In various embodiments, the varifocal module 350 may use eye tracking information obtained from the eye tracking system 345 to determine how to adjust one or more optical elements in the optical assembly 330. In some embodiments, the varifocal module 350 may perform foveated rendering of the image light based on the eye tracking information obtained from the eye tracking system 345 in order to adjust the resolution of the image light emitted by the display 325. In this case, the varifocal module 350 configures the display 325 to display a high pixel density in a foveal region of the user's eye-gaze and a low pixel density in other regions of the user's eye-gaze.

The I/O interface 315 facilitates the transfer of action requests from a user to the console 310. In addition, the I/O interface 315 facilitates the transfer of device feedback from the console 310 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 315 may include one or more input devices. Example input devices include: a keyboard, a mouse, a game controller, a joystick, and/or any other suitable device for receiving action requests and communicating the action requests to the console 310. In some embodiments, the I/O interface 315 includes an IMU 340 that captures calibration data indicating an estimated current position of the I/O interface 315 relative to an initial position of the I/O interface 315.

In operation, the I/O interface 315 receives action requests from the user and transmits those action requests to the console 310. Responsive to receiving the action request, the console 310 performs a corresponding action. For example, responsive to receiving an action request, the console 310 may configure the I/O interface 315 to emit haptic feedback onto an arm of the user. For example, the console 315 may configure the I/O interface 315 to deliver haptic feedback to a user when an action request is received. Additionally or alternatively, the console 310 may configure the I/O interface 315 to generate haptic feedback when the console 310 performs an action, responsive to receiving an action request.

The console 310 provides content to the NED 305 for processing in accordance with information received from one or more of: the DCA 320, the NED 305, and the I/O interface 315. As shown in FIG. 3, the console 310 includes an application store 355, a tracking module 360, and an engine 365. In some embodiments, the console 310 may have additional, fewer, or different modules and/or components than those described in conjunction with FIG. 3. Similarly, the functions further described below may be distributed among components of the console 310 in a different manner than described in conjunction with FIG. 3.

The application store 355 stores one or more applications for execution by the console 310. An application is a group of instructions that, when executed by a processor, performs a particular set of functions, such as generating content for presentation to the user. For example, an application may generate content in response to receiving inputs from a user (e.g., via movement of the NED 305 as the user moves his/her head, via the I/O interface 315, etc.). Examples of applications include: gaming applications, conferencing applications, video playback applications, or other suitable applications.

The tracking module 360 calibrates the NED system 300 using one or more calibration parameters. The tracking module 360 may further adjust one or more calibration parameters to reduce error in determining a position and/or orientation of the NED 305 or the I/O interface 315. For example, the tracking module 360 may transmit a calibration parameter to the DCA 320 in order to adjust the focus of the DCA 320. Accordingly, the DCA 320 may more accurately determine positions of structured light elements reflecting off of objects in the environment. The tracking module 360 may also analyze sensor data generated by the IMU 340 in determining various calibration parameters to modify. Further, in some embodiments, if the NED 305 loses tracking of the user's eye, then the tracking module 360 may re-calibrate some or all of the components in the NED system 300. For example, if the DCA 320 loses line of sight of at least a threshold number of structured light elements projected onto the user's eye, the tracking module 360 may transmit calibration parameters to the varifocal module 350 in order to re-establish eye tracking.

The tracking module 360 tracks the movements of the NED 305 and/or of the I/O interface 315 using information from the DCA 320, the one or more position sensors 335, the IMU 340 or some combination thereof. For example, the tracking module 360 may determine a reference position of the NED 305 from a mapping of an area local to the NED 305. The tracking module 360 may generate this mapping based on information received from the NED 305 itself. The tracking module 360 may also utilize sensor data from the IMU 340 and/or depth data from the DCA 320 to determine references positions for the NED 305 and/or I/O interface 315. In various embodiments, the tracking module 360 generates an estimation and/or prediction for a subsequent position of the NED 305 and/or the I/O interface 315. The tracking module 360 may transmit the predicted subsequent position to the engine 365.

The engine 365 generates a three-dimensional mapping of the area surrounding the NED 305 (i.e., the "local area") based on information received from the NED 305. In some embodiments, the engine 365 determines depth information for the three-dimensional mapping of the local area based on depth data received from the DCA 320 (e.g., depth information of objects in the local area). In some embodiments, the engine 365 calculates a depth and/or position of the NED 305 by using depth data generated by the DCA 320. In particular, the engine 365 may implement various techniques for calculating the depth and/or position of the NED 305, such as stereo based techniques, structured light illumination techniques, time-of-flight techniques, and so forth. In various embodiments, the engine 365 uses depth data received from the DCA 320 to update a model of the local area and to generate and/or modify media content based in part on the updated model.

The engine 365 also executes applications within the NED system 300 and receives position information, acceleration information, velocity information, predicted future positions, or some combination thereof, of the NED 305 from the tracking module 360. Based on the received information, the engine 365 determines various forms of media content to transmit to the NED 305 for presentation to the user. For example, if the received information indicates that the user has looked to the left, the engine 365 generates media content for the NED 305 that mirrors the user's movement in a virtual environment or in an environment augmenting the local area with additional media content. Accordingly, the engine 365 may generate and/or modify media content (e.g., visual and/or audio content) for presentation to the user. The engine 365 may further transmit the media content to the NED 305. Additionally, in response to receiving an action request from the I/O interface 315, the engine 365 may perform an action within an application executing on the console 310. The engine 305 may further provide feedback when the action is performed. For example, the engine 365 may configure the NED 305 to generate visual and/or audio feedback and/or the I/O interface 315 to generate haptic feedback to the user.

In some embodiments, based on the eye tracking information (e.g., orientation of the user's eye) received from the eye tracking system 345, the engine 365 determines a resolution of the media content provided to the NED 305 for presentation to the user on the display 325. The engine 365 may adjust a resolution of the visual content provided to the NED 305 by configuring the display 325 to perform foveated rendering of the visual content, based at least in part on a direction of the user's gaze received from the eye tracking system 345. The engine 365 provides the content to the NED 305 having a high resolution on the display 325 in a foveal region of the user's gaze and a low resolution in other regions, thereby reducing the power consumption of the NED 305. In addition, using foveated rendering reduces a number of computing cycles used in rendering visual content without compromising the quality of the user's visual experience. In some embodiments, the engine 365 can further use the eye tracking information to adjust a focus of the image light emitted from the display 325 in order to reduce vergence-accommodation conflicts.

High-Resolution Liquid Crystal Displays

Figure 4:
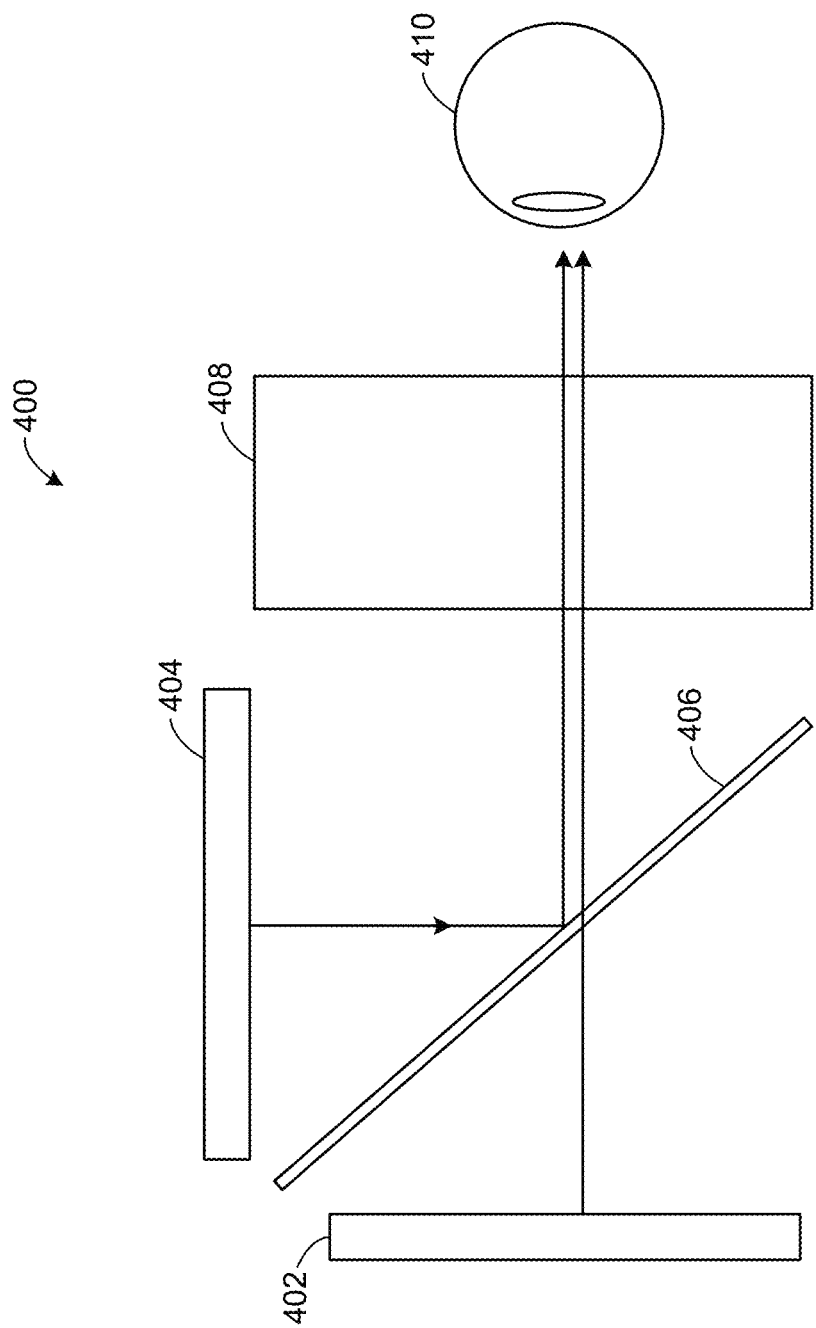
FIG. 4 is a schematic diagram illustrating a display system, according to various embodiments.

FIG. 4 is a schematic diagram illustrating a display system 400, according to various embodiments. As shown, the display system 400 includes a green color liquid crystal display 402, a red and blue color liquid crystal display 404, a combiner 406, and collimating optics 408. In embodiments, the display system 400 can be used to provide image light to one eye, or both eyes, of a user. If the display system 400 provides image light to only one eye of a user, a duplicate display system can be used for the other eye of the user.

In some embodiments, the green color display 402 has higher resolution than the red and blue color display 404. As the photonic response in human eyes is maximum for green color light, the effective resolution of the display system 400 may be that of the higher-resolution green color display 402. For example, users will be able to read small text well if the green color display 402 has sufficiently high resolution, even if the red and blue color display 404 has a lower resolution. In some embodiments, the display system 400 can provide a higher display resolution than conventional color liquid crystal displays (LCDs) by employing a 1:2 or 1:1 sub-pixel aperture ratio, which is smaller than the 1:3 sub-pixel aperture ratio used in conventional color LCDs, as discussed in greater detail below in conjunction with FIGS. 5-7. In addition, greater transmissivity can be achieved in the display system 400 relative to conventional color LCDs. In that regard, the green color display 402 is a single-color display that can include green light-emitting diodes (LEDs), or a quantum dot (QD) layer embedded in a back light unit (BLU) to control a color of the BLU, as opposed to the color filters that are used in conventional color LCDs and can decrease panel transmission by a factor of four. For example, the green color display 402 could include a glass display panel and a display BLU that includes green LEDs, or an embedded QD layer that converts light emitted by LEDs into green light. In contrast to the green color display 402, the red and blue color display 404 can be a color LCD that includes color filters in some embodiments.

In operation, the red and blue colors required to produce an image are emitted by the red and blue color display 404, while the green colors required to produce the same image are emitted by the green color display 402. The combiner 406 combines the light emitted by the two displays 402 and 402, and the combined light is passed through the collimating optics 408 toward a viewer's eye 410.

As shown, the green color display 402 and the red and blue color display 404 are positioned perpendicular to each other. Further, the combiner 406 is positioned such that light emitted by the green color display 402 passes through the combiner 406, while light emitted by the red and blue color display 404 is reflected by the combiner 406. As a result, light emitted by the green color display 402 is combined with light emitted by the red and blue color display 404. In alternative embodiments, the positions of the green color display and the red and blue color displays may be reversed, and a combiner may be used to reflect light emitted by the green color display and pass through light emitted by the red and blue color display.

The combiner 406 can include any optical element(s) suitable for combining light emitted by the green color display 402 with light emitted by the red and blue color display 404. In some embodiments, the combiner 406 is a dichroic element that selectively transmits light within a range of colors, including colors output by the green color display 402, while reflecting other colors of light, including colors output by the red and blue color display 404. Examples of such a dichroic element include dichroic beam splitters, dichroic mirrors, dichroic reflectors, and dichroic filters. It should be understood that some dichroic elements are smaller and/or lighter than others, which can be beneficial for artificial reality systems such as HMDs.

In other embodiments, the combiner 406 may be a polarization-based combiner, assuming that the collimating optics 408 is not polarization-sensitive. It should be understood that LCDs, such as the green color display 402 and the red and blue color display 404, typically emit polarized light. In some embodiments, the green color display 402 and the red and blue color display 404 emit light having different polarizations. In such cases, the combiner 406 can be a polarization-based combiner that selectively transmits light having the polarization of light emitted by the green color display 402, while reflecting light having the polarization of light emitted by the red and blue color display 404 (or vice versa, if the positions of the green color display and the red and blue color displays are reversed and a different polarization-based combiner is used). Examples of such a polarization-based combiner include reflective polarizers and polarizing beam splitters. It should be understood that some polarization-based combiners are smaller and/or lighter than others, which can be beneficial for artificial reality systems such as HMDs.

The collimating optics 408 can include any optical element(s) suitable for collimating light that passes through the collimating optics 408. Light can be collimated to make displayed imagery appear to be at "infinity," or very far away, in augmented reality systems. In some embodiments, a pancake lens may be used as the collimating optics 408. The back focal distances of some pancake lenses may be relatively short, requiring the red and blue color display 404 to be split into two displays, as discussed in greater detail below in conjunction with FIGS. 7-8. Further, a polarization-based combiner cannot be used with a pancake lens that is polarization-sensitive. In other embodiments, a Fresnel lens may be used as the collimating optics 408, as discussed in greater detail below in conjunction with FIGS. 9-10. It should be understood that some collimating optics are smaller and/or lighter than others, which can be beneficial for artificial reality systems such as HMDs.

Figure 5:
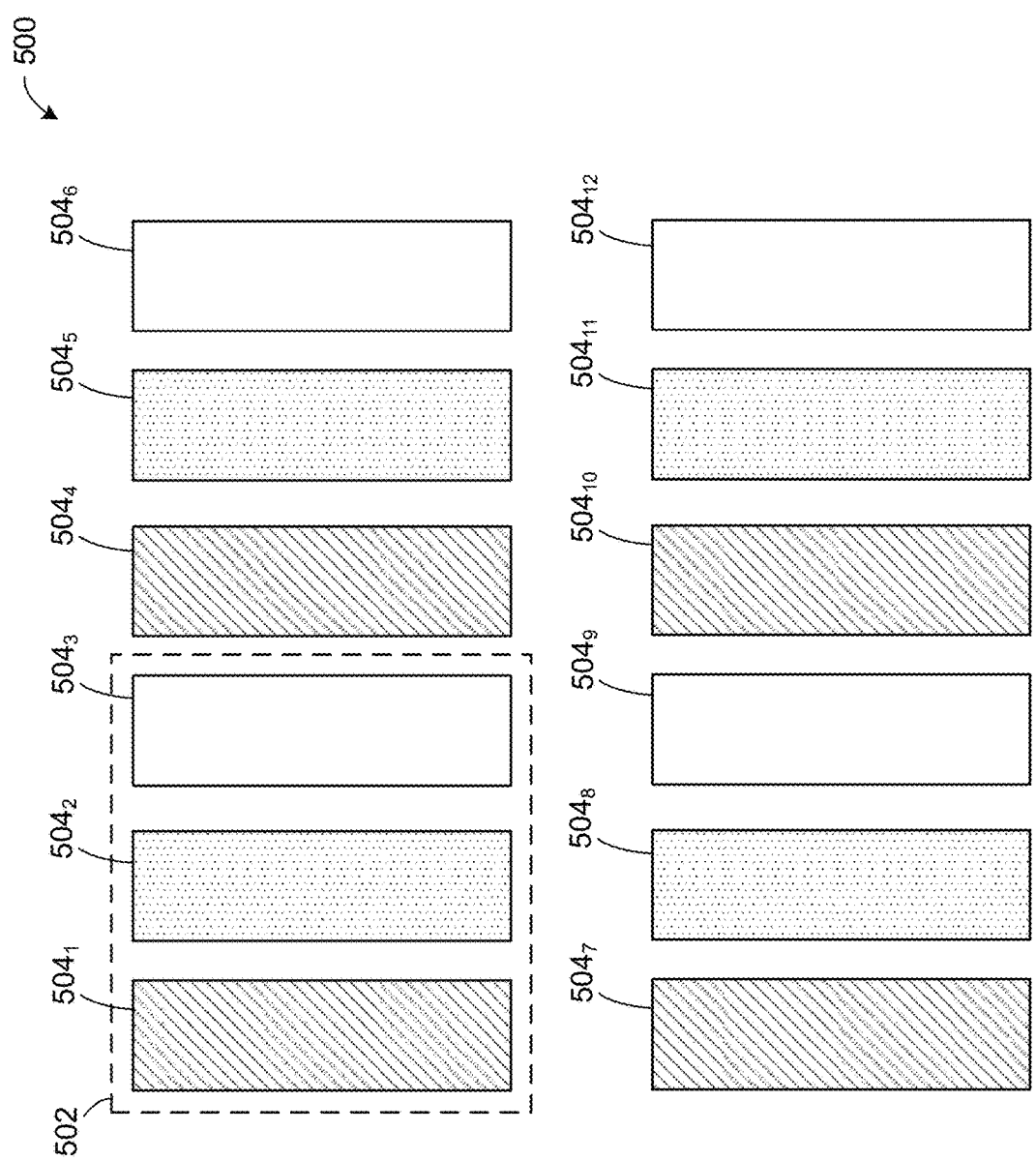
FIG. 5 is a schematic diagram illustrating a pixel geometry used in conventional color liquid crystal displays (LCDs), according to the prior art.

FIG. 5 is a schematic diagram illustrating a pixel geometry 500 used in conventional color LCDs, according to the prior art. In the pixel geometry 500, each pixel includes three sub-pixels for the red, green, and blue colors. As shown, a pixel 502 includes a red sub-pixel $504_1$, a blue sub-pixel $504_2$, and a green sub-pixel $504_3$. Each of the sub-pixels 504, which are referred to herein individually as a sub-pixel 504 and collectively as sub-pixels 504, has a 1:3 aperture ratio, meaning the height of the sub-pixel 504 is three times the width of the sub-pixel 504. Such sub-pixels 504 are also sometimes referred to as "stripes." Existing manufacturing techniques permit the width and height of an LCD sub-pixel (or pixel) to be a minimum of 8 microns. Accordingly, each sub-pixel 504 can be a minimum of 8×24 microns in size, and each pixel (e.g., the pixel 502) that includes three sub-pixels 504 can be a minimum of 24×24 microns in size. Due to this size limitation, the resolution of conventional color LCDs is not sufficiently high for some artificial reality systems.

Figure 6:
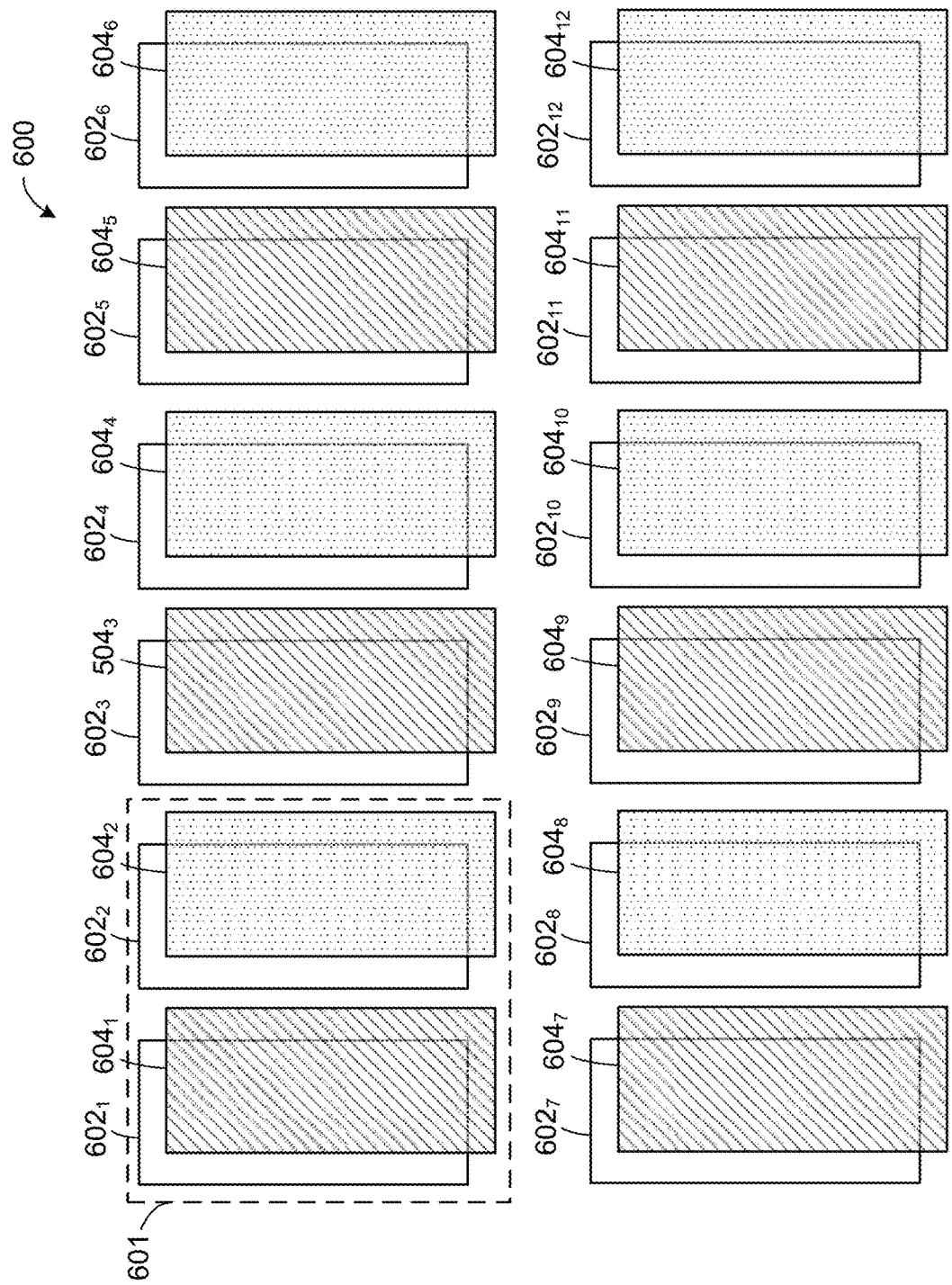
FIG. 6 is a schematic diagram illustrating a pixel geometry that can be used in the display system of FIG. 4, according to various embodiments.

FIG. 6 is a schematic diagram illustrating a pixel geometry 600 that can be used in the display system 400 of FIG. 4, according to various embodiments. In the pixel geometry 600, each pixel includes a red sub-pixel and a blue sub-pixel from the red and blue color display 404, as well as two sub-pixels from the green color display 402. As shown, sub-pixels 602 from the red and blue color display 404, which are referred to herein individually as a sub-pixel 602 and collectively as sub-pixels 602, alternate between red and blue. Further, each red or blue sub-pixel 602 from the red and blue color display 404 corresponds to a green sub-pixel 604 from the green color display 402, which are referred to herein individually as a green sub-pixel 604 and collectively as green sub-pixels 904. For example, a pixel 501 includes a red sub-pixel $604_1$, a blue sub-pixel $604_2$, and two corresponding green sub-pixels $602_1$ and $602_2$.

It should be noted that the green color display 402 that provides the green sub-pixels 604 has a higher resolution than the red and blue color display 404 that provides the red and blue sub-pixels 602, as each of the green sub-pixels 604 is a pixel of the green color display 402, whereas pairs of the red and blue sub-pixels 604 form a pixel in the red and blue color display 404. However, if a 1:3 sub-pixel aperture ratio were used, as in the pixel geometry 500 described above in conjunction with FIG. 5, then the display resolution would be increased in only the horizontal direction. In some embodiments, a different sub-pixel aperture ratio is employed to increase the display resolution in the vertical direction as well.

As shown, each of the sub-pixels 602 and 604 in the pixel geometry 600 has a 1:2 aperture ratio, as opposed to the 1:3 sub-pixel aperture ratio used in conventional color LCDs. As existing manufacturing techniques permit the width and height of a sub-pixel (or pixel) to be a minimum of 8 microns, each of the sub-pixels 602 and 604 can be a minimum of 8×16 microns in size, and each pixel (e.g., the pixel 601) that includes two sub-pixels 602 and two sub-pixels 604 can be a minimum of 16×16 microns in size. The smaller possible sizes of sub-pixels (and pixels) in the display system 400 relative to the sub-pixels (and pixels) of conventional color LCDs enables higher display resolutions, including resolutions greater than those achievable with conventional color LCDs.

Figure 7:
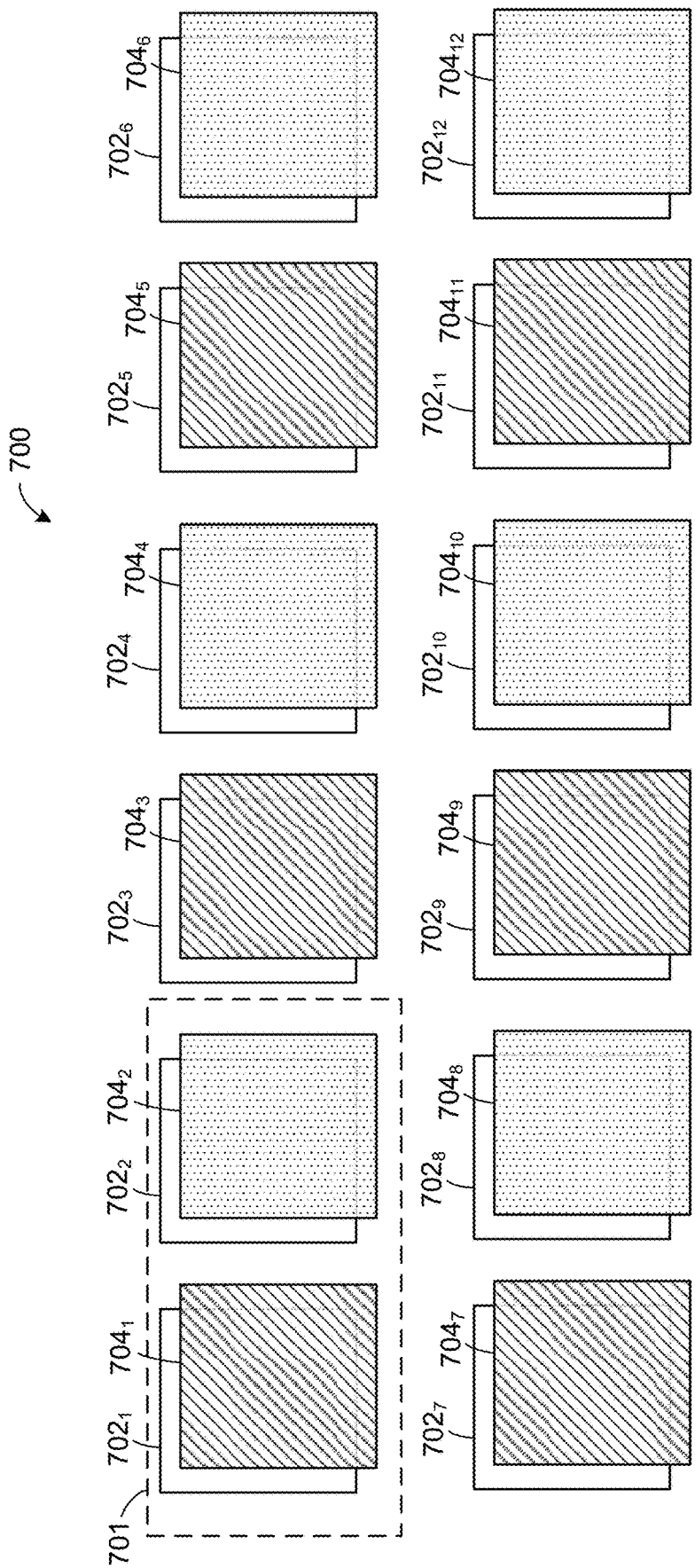
FIG. 7 is a schematic diagram illustrating an alternative pixel geometry that can be used in the display system of FIG. 4, according to various embodiments.

FIG. 7 is a schematic diagram illustrating an alternative pixel geometry 700 that can be used in the display system of FIG. 4, according to various embodiments. Similar to the pixel geometry 600, each pixel in the pixel geometry 700 includes a red sub-pixel and a blue sub-pixel from the red and blue color display 404, as well as corresponding green sub-pixels from the green color display 402. As shown, sub-pixels 704 from the red and blue color display 404, which are referred to herein individually as a sub-pixel 704 and collectively as sub-pixels 704, alternate between red and blue, and each red or blue sub-pixel 704 from the red and blue color display 404 corresponds to a green sub-pixel 702 of the green color display 402, which are referred to herein individually as a green sub-pixel 702 and collectively as green sub-pixels 702. Illustratively, a pixel 701 includes a red sub-pixel 704₁, a blue sub-pixel 704₂, and two corresponding green sub-pixels 702₁ and 702₂.

As shown, each of the sub-pixels 702 and 704 has a 1:1 aperture ratio. As described, existing manufacturing techniques permit the width and height of a sub-pixel (or pixel) to be a minimum of 8 microns. Accordingly, each of the sub-pixels 702 and 704 can be a minimum of 8×8 microns in size, and each pixel (e.g., the pixel 701) that includes two sub-pixels 702 and two sub-pixels 704 can be a minimum of 8×16 microns in size. In some embodiments, pixels of such sizes can provide a 1-1.5 arcminute resolution. The smaller possible sizes of such sub-pixels (and pixels) relative to the sub-pixels (and pixels) of conventional color LCDs enables higher display resolutions, including resolutions greater than those achievable with conventional color LCDs.

Although pixel geometries are described herein primarily with respect to pixels and sub-pixels in the form of rectangles or squares, in other embodiments, the pixels and sub-pixels can be of any technically feasible shape, such as hexagons or circles.

Figure 8:
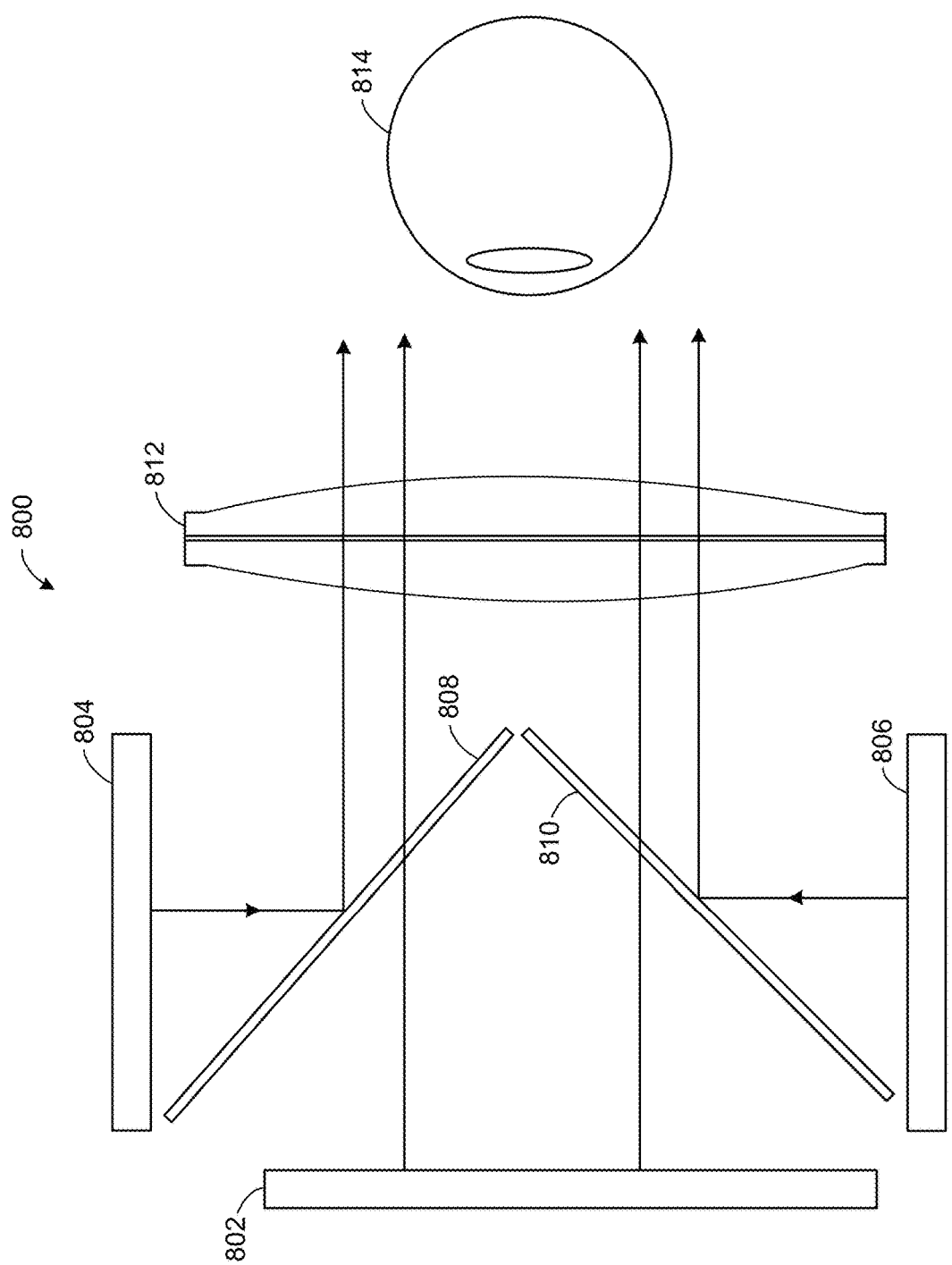
FIG. 8 is a schematic diagram illustrating a display system that includes two red and blue color displays, according to various embodiments.

FIG. 8 is a schematic diagram illustrating a display system 800 that includes two red and blue color displays, according to various embodiments. As shown, the display system 800 includes a green color display 802, two red and blue color displays 804 and 806 that are positioned opposite each other, two combiners 808 and 810 that combine light emitted by the green color display 802 with light emitted by the red and blue color displays 804 and 806, respectively, and a pancake lens 812 that collimates the combined light.

The green color display 802 is similar to the green color display 402 described above in conjunction with FIG. 4. The red and blue color displays 804 and 806 are similar to the red and blue color display 404 described above in conjunction with FIG. 4, except that each of the red and blue color displays 804 and 806 is configured to display the red and blue colors from only half of an image. For example, the red and blue color display 804 could display a left half, and the red and blue color display 806 could display a right half, of an image. Two combiners 808 and 810, which are similar to the combiner 406 described above in conjunction with FIG. 4, are used to combine light from the green color display 802 and the red and blue color displays 804 and 806, respectively. Similar to the description above in conjunction with FIG. 4, the combiners 808 and 810 cannot be polarization-based, as the pancake lens 812 is polarization-sensitive. In alternative embodiments, a green color display may be split in half rather than a red and blue color display.

As described, the two red and blue color displays 804 and 806 (or two green color displays) are required if the pancake lens 812 has a relatively short back focal distance. If a pancake lens (or other collimating optics) having a longer focal distance is used, then only one red and blue color display (e.g., the red and blue color display 404) may be required. On the other hand, the display system 800 that includes the pancake lens 812 can be more compact, and lighter, than some other display systems.

Figure 9:
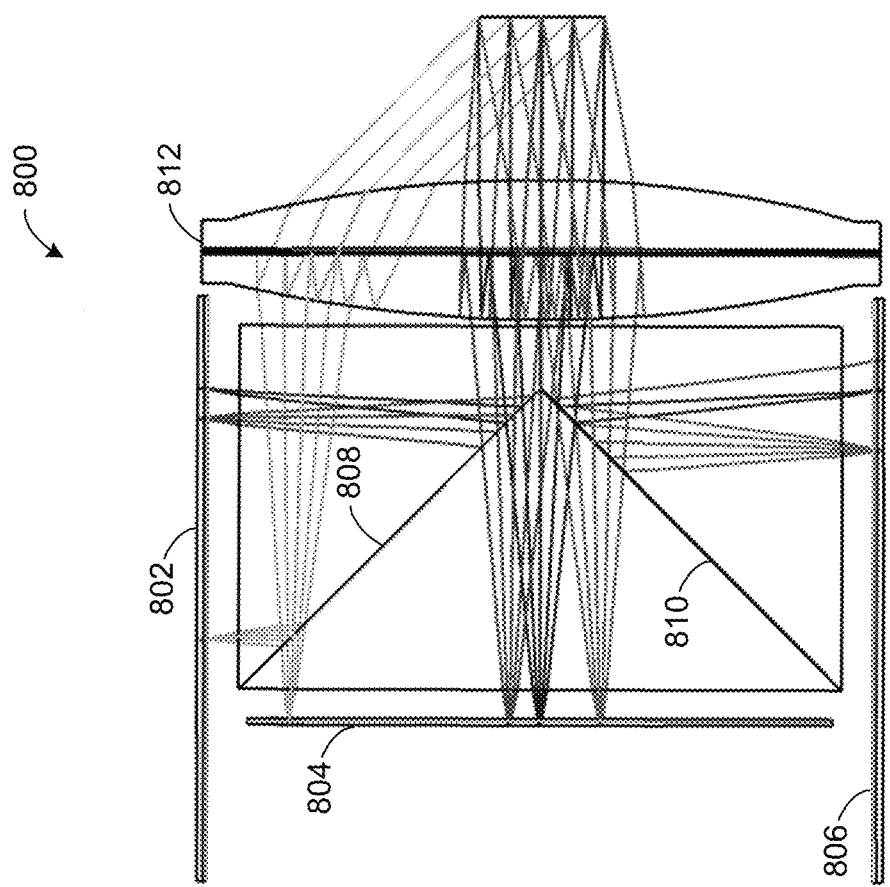
FIG. 9 illustrates in greater detail the display system of FIG. 8, according to various embodiments.

FIG. 9 illustrates in greater detail the display system 800 of FIG. 8, according to various embodiments. In particular, FIG. 9 shows how the combiners 808 and 810 combine light emitted by the red and blue color displays 802 and 806 with light emitted by the green color display 802, as well as how the combined light is collimated by the pancake lens 812.

Figure 10:
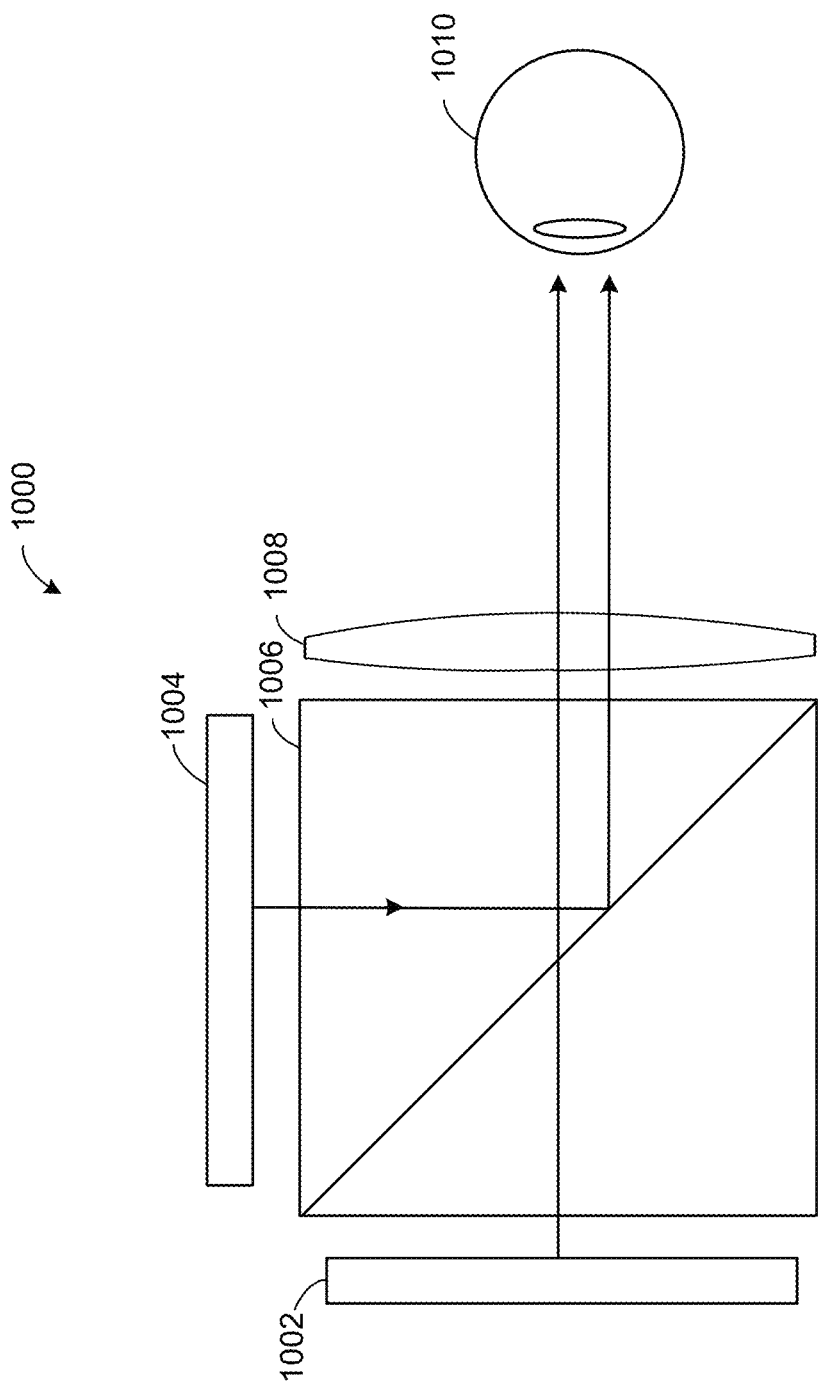
FIG. 10 is a schematic diagram illustrating a display system that includes a Fresnel lens, according to various embodiments.

FIG. 10 is a schematic diagram illustrating a display system 1000 that includes a Fresnel lens, according to various embodiments. As shown, the display system 1000 includes a green color display 1002, a red and blue color display 1004, a beam splitter 1006, and a Fresnel lens 1008.

The green color display 1002 and the red and blue color display 1004 are similar to the green color display 402 and the red and blue color display 404, respectively, that are described above in conjunction with FIG. 4.

The Fresnel lens 1008 has a longer back focal distance than the pancake lens 812 described above in conjunction with FIG. 8. As a result, the red and blue color display 1004 is not split into two displays. However, the display system 1000 may be less compact and heavier than the display system 800 that includes the pancake lens 812.

The beam splitter, which is similar to the combiner 406 described above in conjunction with FIG. 4, may be a dichroic or polarizing beam splitter in some embodiments. Similar to the display system 400 described above in conjunction with FIG. 4, the beam splitter 1006 transmits light emitted by the green color display 1002 and reflects light emitted by the red and blue color display 1004 (or vice versa if the positions of the green color display and the red and blue color displays is reversed and a different beam splitter is used), thereby combining the light emitted by the two displays 1002 and 1004. The combined light from the green color display 1002 and the red and blue color display 1004 is then passed through the Fresnel lens 1008, which collimates the combined light.

Figure 11:
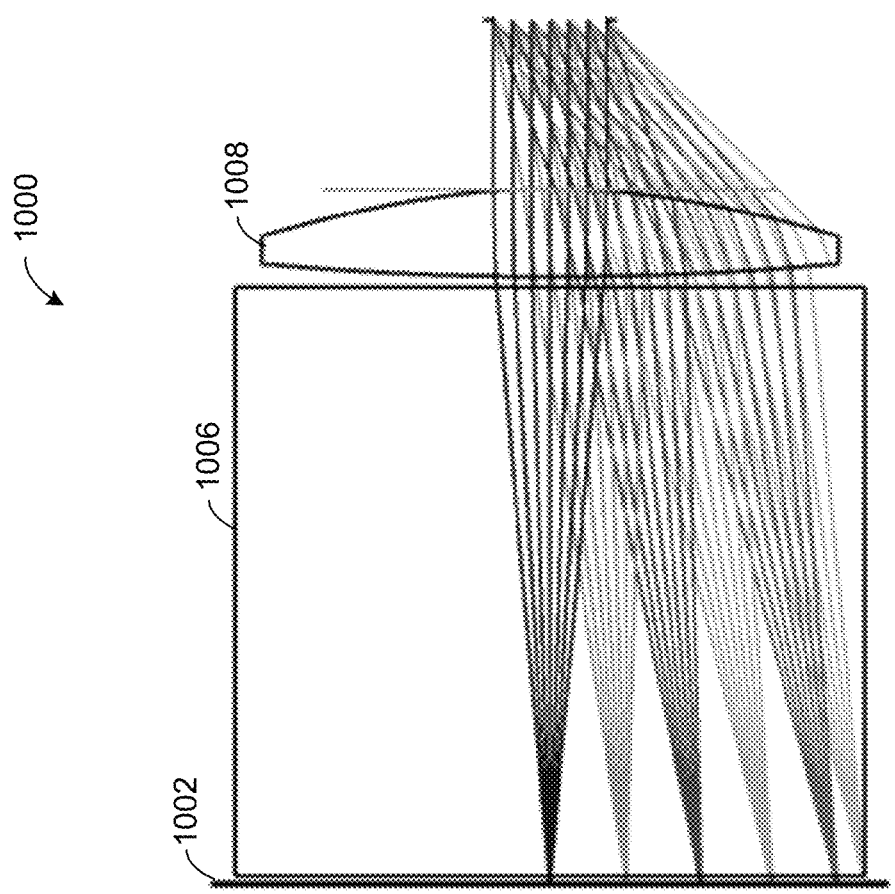
FIG. 11 illustrates in greater detail the green color display, beam splitter, and Fresnel lens of FIG. 10, according to various embodiments.

FIG. 11 illustrates in greater detail the green color display 1102, the beam splitter 1106, and the Fresnel lens 1108 of FIG. 10, according to various embodiments. In particular, FIG. 11 shows how the beam splitter 1106 combines light emitted by the red and blue color displays 802 and 806 and light emitted by the green color display 802, as well as how the combined light is collimated by the pancake lens 812.

Figure 12:
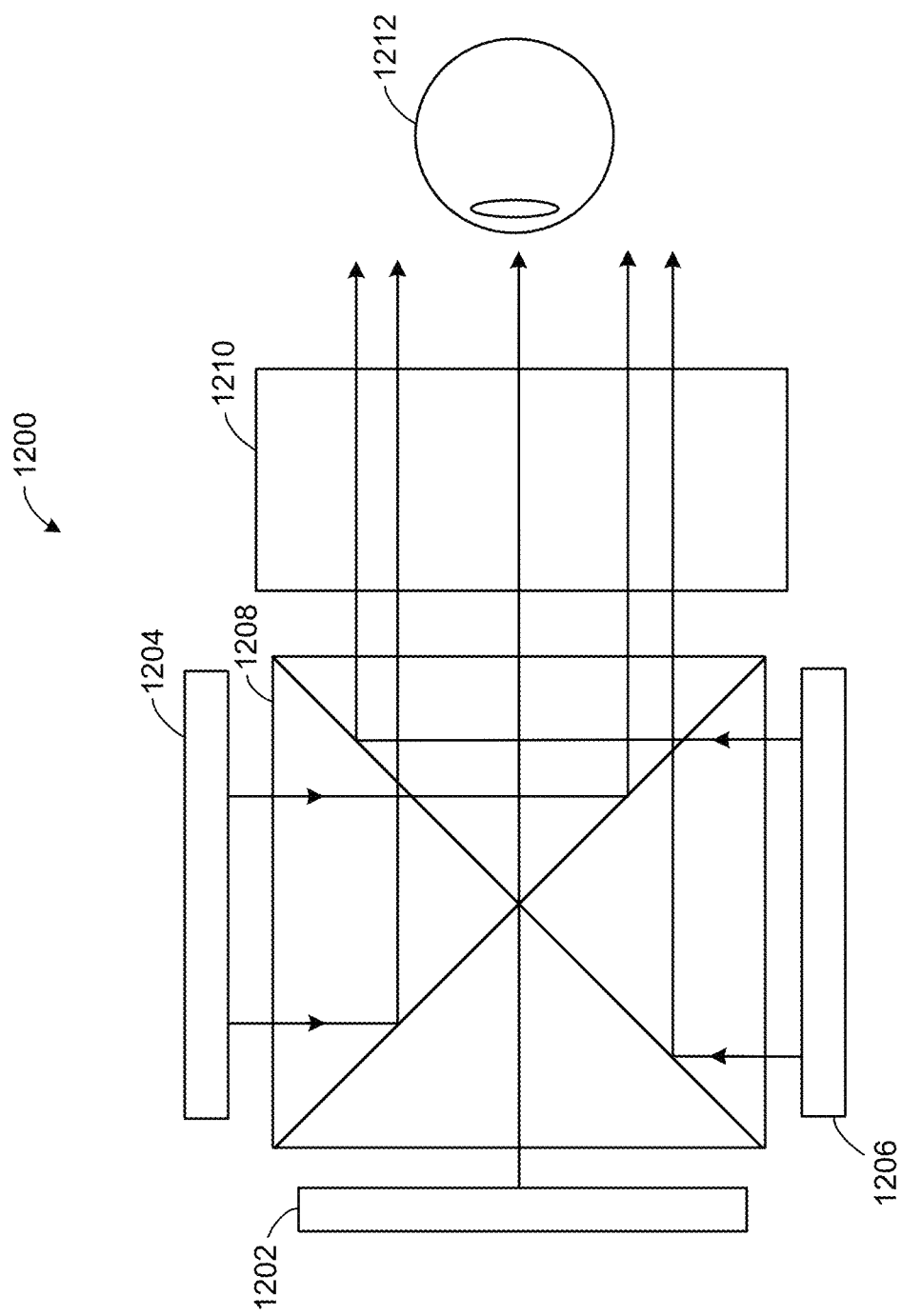
FIG. 12 is a schematic diagram illustrating a display system that includes a cross-dichroic prism, according to various embodiments.

FIG. 12 is a schematic diagram illustrating a display system 1200 that includes a cross-dichroic prism, according to various embodiments. As shown, the display system 1200 includes a green color display 1202, a red color display 1204, a blue color display 1206, a cross-dichroic prism 1208 (also referred to herein as an "X-cube"), and collimating optics 1210. The green color display 1202 and the collimating optics 1210 are similar to the green color display 402 and the collimating optics 408 described above in conjunction with FIG. 4. The red color display 1204 and the blue color display 1206 are each single-color displays, which as described above can include color LEDs or a QD film embedded in a BLU to control the color of emitted light, as opposed to color filters, thereby permitting higher transmissivity relative to conventional color LCD displays that include color filters. In addition, a pixel geometry can be used that enables pixel sizes as small as 8×8 microns, as discussed in greater detail below in conjunction with FIG. 13. However, the display system 1200 may require a large back focal distance, and therefore be less compact and heavier than, the display systems 400, 800, and 1000 described above in conjunction with FIGS. 4, 8, and 10, respectively.

As shown, the green color display 1202, the red color display 1204, and the blue color display 1206 are positioned on different sides of the X-cube 1208. In operation, the red, green, and blue colors required to produce an image are emitted by the red 1204, green 1202, and blue 1206 color displays, respectively. As shown, light emitted by the green color display 1202 passes through the X-cube 1208, while light emitted by the red color display 1204 and the blue color display 1206 are reflected by the X-cube 1208. Accordingly, the X-cube 1208 combines the light emitted by the green color display 1202 with the light emitted by the red color display 1204. The combined light is then passed through the collimating optics 1210 toward a viewer's eye 1212.

Figure 13:
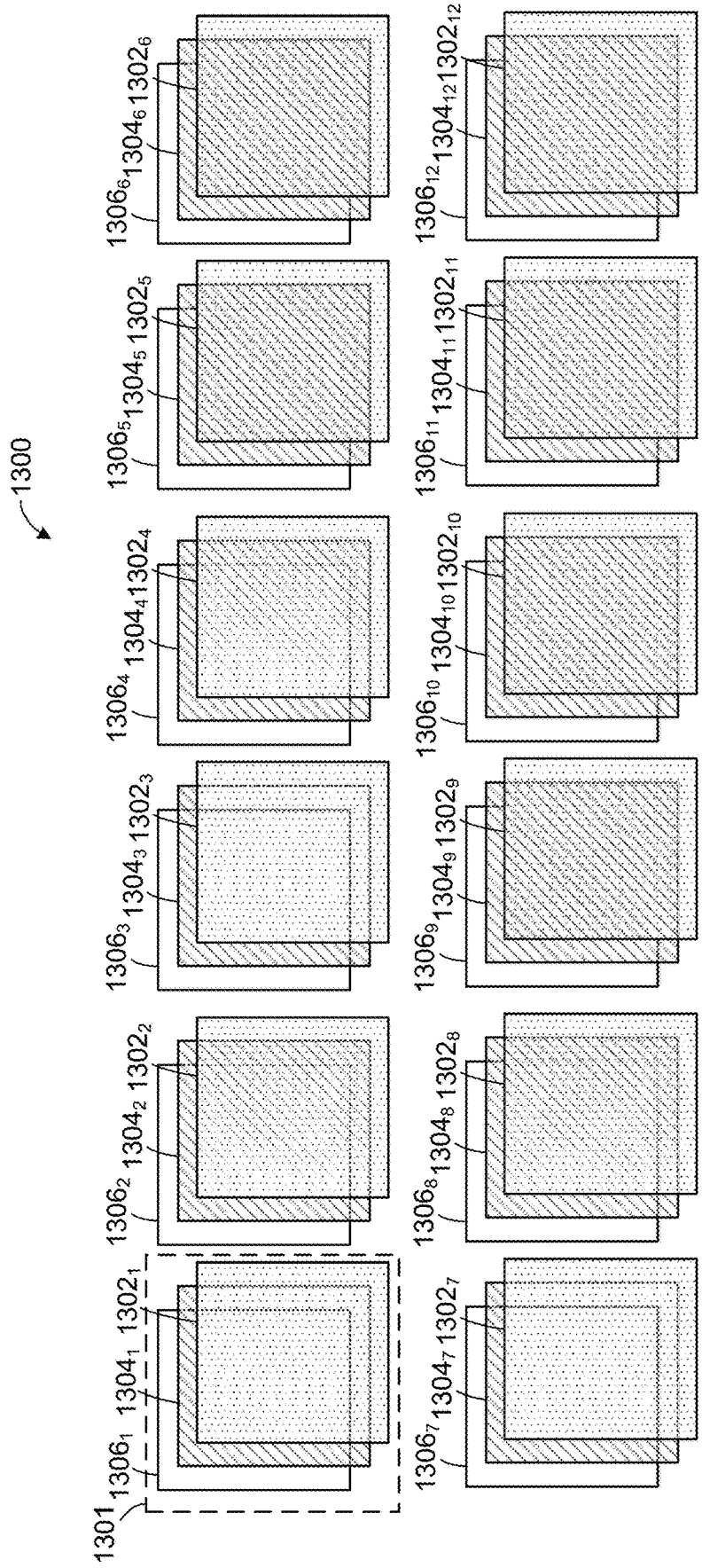
FIG. 13 is a schematic diagram illustrating a pixel geometry of the display system of FIG. 12, according to various embodiments.

FIG. 13 is a schematic diagram illustrating a pixel geometry 1300 of the display system of FIG. 12, according to various embodiments. As shown, each pixel in the pixel geometry 1300 includes a red sub-pixel 1302 from the red color display 1204, a blue sub-pixel 1306 from the blue color display 1202, and a green sub-pixel 1302 from the green color display 1202. The red sub-pixels 1302, the blue sub-pixels 1304, and the green sub-pixels 1306 are referred to herein individually as a red sub-pixel 1302, a blue sub-pixel 1304, and a green sub-pixel 1306, respectively, and collectively as red sub-pixels 1302, blue sub-pixels 1304, and green sub-pixels 1306, respectively. Illustratively, a pixel 1301 includes a red sub-pixel 13021, as well as a corresponding blue sub-pixel 13042 and green sub-pixel 13061.

As shown, each of the red, blue, and green sub-pixels 1302, 1304, and 1306 has a 1:1 aperture ratio. As described, existing manufacturing techniques permit the width and height of a sub-pixel (or pixel) to be a minimum of 8 microns. Accordingly, each of the red, blue, and green sub-pixels 1302, 1304, and 1306 can be a minimum of 8×8 microns in size, and each pixel (e.g., the pixel 1301) that includes one of the red sub-pixels 1302, one of the blue sub-pixels 1304, and one of the green sub-pixels 1306 can be a minimum of 8×8 microns in size. The smaller possible sizes of such sub-pixels (and pixels) relative to the sub-pixels (and pixels) of conventional color LCDs enables higher display resolutions, including resolutions greater than those achievable with conventional color LCDs.

Although the red, blue, and green sub-pixels 1302, 1304, and 1306 are shown as squares for illustrative purposes, in other embodiments sub-pixels and pixels can be of any technically feasible shape, such as hexagons or circles.

Figure 14:
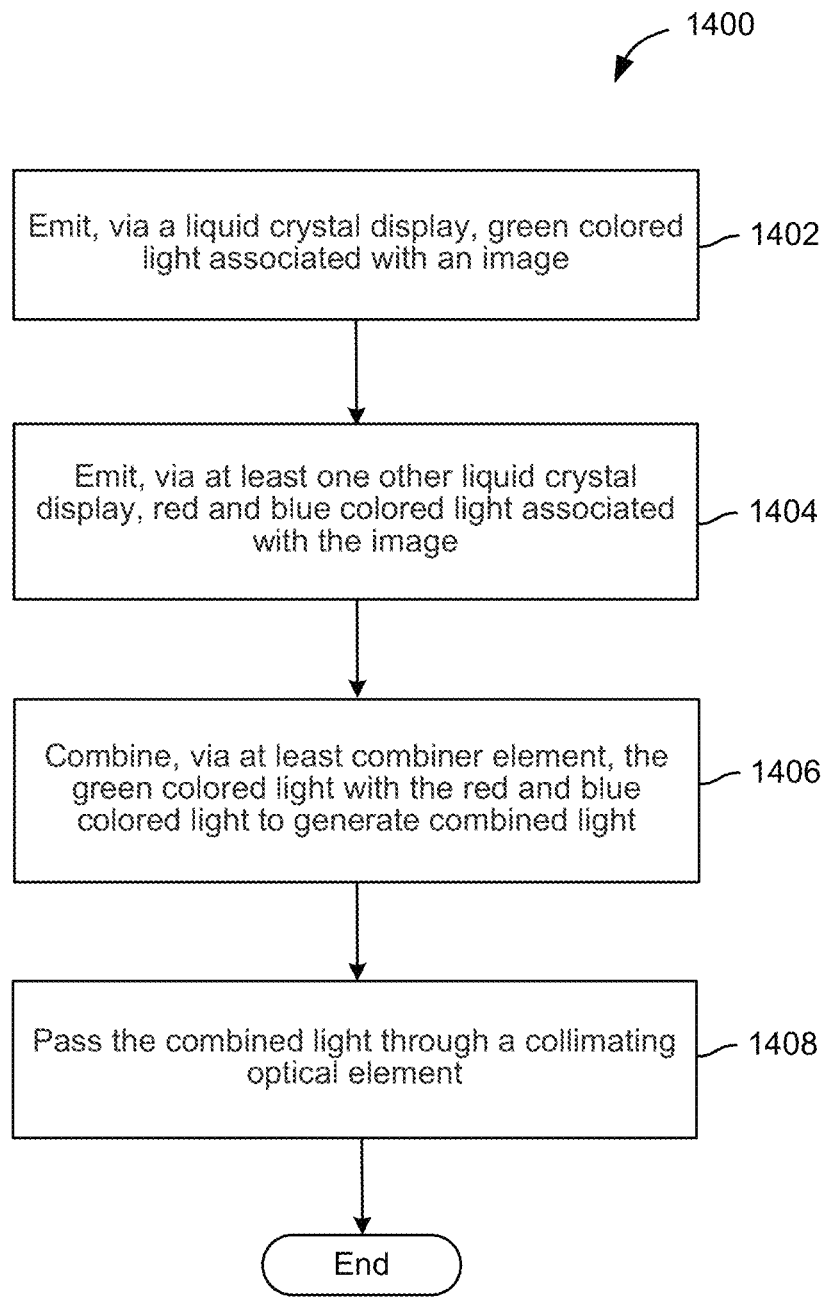
FIG. 14 is a flow diagram of method steps for displaying an image, according to various embodiments.

FIG. 14 is a flow diagram of method steps for displaying an image, according to various embodiments. Although the method steps are described with reference to the systems of FIGS. 4 and 6-13, persons skilled in the art will understand that any system may be configured to implement the method steps, in any order, in other embodiments.

As shown, a method 1400 begins at step 1402, where green colored light associated with an image is emitted via an LCD. The LCD may be, e.g., one of the green color displays 402, 802, 1002, or 1202 described above in conjunction with FIGS. 4, 8, 10, and 12, respectively. More generally, any LCD that emits light in a range of wavelengths corresponding to what humans perceive as green colors may be used. As described, such an LCD may include green LEDs or a QD layer embedded in a BLU, rather than color filters, in some embodiments.

At step 1404, red and blue colored light associated with the image is emitted via at least one other LCD. The at least one other LCD may be, e.g., the red and blue color displays 404, 804 and 806, or 1004 described above in conjunction with FIGS. 4, 8, and 10, respectively, or the red color display 1204 and the blue color display 1206 described above in conjunction with FIG. 12. More generally, any LCD(s) that emit light in ranges of wavelengths corresponding to red and blue colors may be used. As described, such LCD(s) may use red and blue color filters in some embodiments, or red and blue LEDs if the display system includes a red color LCD and a separate blue color LCD.

At step 1406, the green colored light and the red and blue colored light are combined via at least one combiner element to generated combined light. The at least one combiner element may include, e.g., dichroic or polarization-based combiner(s), such as the combiner 406, the combiners 808 and 810, the beam splitter 1006, or the X-cube 1208 described above in conjunction with FIGS. 4, 8, 10, and 12, respectively.

At step 1408, the combined light is passed through a collimating optical element. The collimating optical element may be, e.g., one of the collimating optics 408, the pancake lens 812, the Fresnel lens 1008, or the collimating optics 1210 described above in conjunction with FIGS. 4, 8, 10, and 12, respectively.

Although described herein primarily with respect to displays that are not transparent, in alternative embodiments one or more transparent displays may be used, such as a transparent green color display and/or a transparent red and blue color display. In such cases, light emitted by the transparent displays can be combined by positioning one display in front of another, without requiring a combiner element.

In sum, embodiments disclosed herein relate to high-resolution liquid crystal displays. In some embodiments, light emitted by a high-resolution green color liquid crystal display is combined, via a combiner, with light emitted by at least one lower-resolution red and blue color liquid crystal display. The red and blue color display(s) may include a single display or two displays positioned on opposing sides of the combiner. The combiner may be a dichroic or polarization-based combiner. Combined light from the green color display and the red and blue color display(s) is passed through collimating optics, such as a pancake lens or a Fresnel lens, toward a viewer's eye. As human eyes are most sensitive to green colored light, use of a higher-resolution green color display permits increased resolution relative to conventional color LCDs. In particular, some embodiments employ a 1:2 or 1:1 sub-pixel aperture ratio, which permits the sub-pixels and pixels of the display system to be smaller than the sub-pixels and pixels in conventional color LCDs. In addition, a green color display that includes green LEDs, or a QD layer embedded in a BLU, can be used to achieve higher transmissivity of green colored light relative to conventional color LCDs that rely on color filters.

One advantage of the display systems disclosed herein is that higher display resolutions can be achieved relative to conventional color LCDs. In addition, the display systems disclosed herein can be brighter than conventional color LCDs, particularly for green colored light. As a result, the display systems disclosed herein may be more suitable for some artificial reality systems, such as HMDs, than conventional color LCDs. These technical advantages represent one or more technological advancements over prior art approaches.

1. In some embodiments, a display system comprises a first display configured to emit light within a first range of wavelengths, a second display configured to emit light within at least one other range of wavelengths, a combiner element, and a collimating optical element.

2. The display system of clause 1, wherein the first range of wavelengths is associated with green colors, and the at least one other range of wavelengths is associated with red and blue colors.

3. The display system of clauses 1 or 2, wherein the first display comprises green light emitting diodes (LEDs).

4. The display system of any of clauses 1-3, wherein the first display is positioned such that the light within the first range of wavelengths is transmitted by the combiner element, and the second display is positioned such that the light within the at least one other range of wavelengths is reflected by the combiner element.

5. The display system of any of clauses 1-4, wherein the combiner element is one of a dichroic or a polarization-based combiner.

6. The display system of any of clauses 1-5, wherein the collimating optical element is a pancake lens.

7. The display system of any of clauses 1-6, further comprising a third display configured to emit light within the at least one other range of wavelengths, wherein the second display and the third display are each configured to display half of an image.

8. The display system of any of clauses 1-7, wherein the collimating optical element is a Fresnel lens.

9. The display system of any of clauses 1-8, wherein the first range of wavelengths is associated with green colors, the at least one other range of wavelengths is associated with red colors, and the display system further comprises a third display configured to emit light that is within a range of wavelengths associated with blue colors.

10. The display system of any of clauses 1-9, wherein the combiner element is a cross-dichroic prism.

11. The display system of any of clauses 1-10, wherein pixels in the display system include sub-pixels having either a 1:2 aperture ratio or a 1:1 aperture ratio.

12. The display system of any of clauses 1-11, wherein the first display and the second display are liquid crystal displays (LCDs).

13. In some embodiments, a head-mounted display (HMD) comprises a display system, the display system comprising a first display configured to emit light within a first range of wavelengths, a second display configured to emit light within at least one other range of wavelengths, a combiner element, and a collimating optical element.

14. The HMD of clause 13, wherein the first range of wavelengths is associated with green colors, the at least one other range of wavelengths is associated with red and blue colors, and the first display has higher resolution than the second display.

15. The HMD of clauses 13 or 14, wherein the combiner element is one of a dichroic, a cross-dichroic prism, or a polarization-based combiner.

16. The HMD of any of clauses 13-15, wherein the collimating optical element is one of a pancake lens or a Fresnel lens.

17. The HMD of any of clauses 13-16, wherein pixels in the display system include sub-pixels having either a 1:2 or a 1:1 aperture ratio.

18. In some embodiments, a method comprises emitting, via a first display, light within a first range of wavelengths, emitting, via a second display, light within at least one other range of wavelengths, combining, via a combiner element, the light within the first range of wavelengths and the light within the at least one other range of wavelengths to generate combined light, and passing the combined light through a collimating optical element.

19 The method of clause 18, wherein the first range of wavelengths is associated with green colors, and the at least one other range of wavelengths is associated with red and blue colors.

20. The method of clauses 18 or 19, wherein combining the light within the first range of wavelengths and the light within the at least one other range of wavelengths comprises transmitting, via the combiner element, the light within the first range of wavelengths, and reflecting, via the combiner element, the light within the at least one other range of wavelengths.

Any and all combinations of any of the claim elements recited in any of the claims and/or any elements described in this application, in any fashion, fall within the contemplated scope of the present disclosure and protection.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The descriptions of the various embodiments have been presented for purposes of illustration, but are not intended to be exhaustive or limited to the embodiments disclosed. Many modifications and variations is apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It is understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A display system, comprising:
a first display configured to emit light within a first range of wavelengths;
a second display configured to emit light within at least one other range of wavelengths, the second display having a lower resolution than the first display;
a third display configured to emit light within the at least one other range of wavelengths, wherein the second display and the third display are each configured to display different halves of an image;
a combiner element; and
a collimating optical element.

2. The display system of claim 1, wherein the at least one other range of wavelengths is associated with red and blue colors.

3. The display system of claim 2, wherein the first display comprises green light emitting diodes or a quantum dot layer embedded in a back light unit.

4. The display system of claim 1, wherein:
the first display is positioned such that the light within the first range of wavelengths is transmitted by the combiner element; and
the second display is positioned such that the light within the at least one other range of wavelengths is reflected by the combiner element.

5. The display system of claim 1, wherein the combiner element is one of a dichroic or a polarization-based combiner.

6. The display system of claim 1, wherein the collimating optical element is a pancake lens.

7. The display system of claim 1, wherein the collimating optical element is a Fresnel lens.

8. The display system of claim 1, wherein the first range of wavelengths is associated with green colors, the at least one other range of wavelengths is associated with red colors, and the third display is configured to emit light that is within a range of wavelengths associated with blue colors.

9. The display system of claim 8, wherein the combiner element is a cross-dichroic prism.

10. The display system of claim 1, wherein pixels in the display system include sub-pixels having either a 1:2 aperture ratio or a 1:1 aperture ratio.

11. The display system of claim 1, wherein the first display and the second display are liquid crystal displays (LCDs).

12. A head-mounted display (HMD), comprising:
a display system, the display system comprising:
a first display configured to emit light within a first range of wavelengths;
a second display configured to emit light within at least one other range of wavelengths, the second display having a lower resolution than the first display;
a third display configured to emit light within the at least one other range of wavelengths, wherein the second display and the third display are each configured to display different halves of an image;

a combiner element; and a collimating optical element.

13. The HMD of claim 12, wherein the at least one other range of wavelengths is associated with red and blue colors.

14. The HMD of claim 12, wherein the combiner element is one of a dichroic, a cross-dichroic prism, or a polarization-based combiner.

15. The HMD of claim 12, wherein the collimating optical element is one of a pancake lens.

16. The HMD of claim 12, wherein the collimating optical element is a Fresnel lens.

17. The HMD of claim 12, wherein pixels in the display system include sub-pixels having either a 1:2 or a 1:1 aperture ratio.

* * * * *